US007152030B2

(12) United States Patent
Nagashima et al.

(10) Patent No.: US 7,152,030 B2
(45) Date of Patent: Dec. 19, 2006

(54) NUMERICAL CONTROL APPARATUS

(75) Inventors: Noritake Nagashima, Yamanashi (JP); Mitsuru Mochizuki, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/043,141

(22) Filed: Jan. 27, 2005

(65) Prior Publication Data
US 2005/0171624 A1 Aug. 4, 2005

(30) Foreign Application Priority Data
Jan. 29, 2004 (JP) ............................. 2004/021335

(51) Int. Cl.
*G06F 17/28* (2006.01)
*G06F 17/21* (2006.01)
*G06F 9/44* (2006.01)
*G06F 9/45* (2006.01)
*G05B 11/01* (2006.01)

(52) U.S. Cl. .............................. 704/8; 704/2; 715/512; 715/526; 715/536; 717/113; 717/125; 717/136; 700/18; 700/26

(58) Field of Classification Search ................ 717/113, 717/125, 136–143, 164; 715/512, 526, 536; 704/2, 5, 8, 275, 277; 700/11, 17, 18, 23, 700/26; 345/418, 619, 672, 676
See application file for complete search history.

(56) References Cited

U.S. PATENT DOCUMENTS

| 4,488,258 | A | * | 12/1984 | Struger et al. ............... 700/18 |
| 5,652,824 | A | * | 7/1997 | Hirayama et al. ............ 386/95 |
| 5,737,308 | A | * | 4/1998 | Nakai et al. ............. 369/275.2 |
| 5,813,019 | A | * | 9/1998 | Van De Vanter ............ 715/512 |
| 5,878,262 | A | * | 3/1999 | Shoumura et al. .......... 717/164 |
| 6,651,110 | B1 | | 11/2003 | Caspers et al. ............... 710/13 |
| 6,951,010 | B1 | * | 9/2005 | Sasaki ........................ 717/123 |
| 6,993,487 | B1 | * | 1/2006 | Bluvband ................... 704/275 |
| 2004/0205649 | A1 | * | 10/2004 | Chakmakian ............... 715/530 |
| 2005/0131672 | A1 | * | 6/2005 | Dalal et al. .................... 704/2 |
| 2005/0283736 | A1 | * | 12/2005 | Elie ........................... 715/771 |
| 2006/0020928 | A1 | * | 1/2006 | Holloway et al. .......... 717/136 |

FOREIGN PATENT DOCUMENTS

| EP | 0 563 390 | | 10/1993 |
| JP | 59072516 A | * | 4/1984 |
| JP | 04128926 A | * | 4/1992 |
| JP | 5-80815 | | 4/1993 |
| JP | 2004280585 A | * | 10/2004 |

* cited by examiner

*Primary Examiner*—Crystal J. Barnes
(74) *Attorney, Agent, or Firm*—Staas & Halsey LLP

(57) ABSTRACT

A numerical control apparatus incorporating a programmable controller and capable of displaying a comment in a plurality of languages with a single sequence program and of displaying a comment in a maintenance screen in a manner suited to the screen. The sequence program has a signal information area stored at its addresses with comments on signals or on the sequence program, each comment being written in a plurality of languages. Languages serving as display (language) attributes of each comment are also stored. In displaying a ladder diagram after the setting of language (for example, English) is completed, as for an address for which there is any comment of the preset language (English), such comment (second comment written in English) is displayed. Comments displayed in a desired language make it easy to perform the maintenance and management of the programmable controller and the numerical control apparatus.

6 Claims, 7 Drawing Sheets

NUMERICAL CONTROL APPARATUS

BACKGROUND OF THE INVENTION

1. Field of the Invention

The present invention relates to a numerical control apparatus incorporating therein a programmable controller.

2. Description of Related Art

A numerical control apparatus for controlling a machine tool or the like incorporates a programmable controller that performs sequence control or other control of the machine controlled by the numerical control apparatus. Generally, a sequence program executed by the programmable controller is displayed in the form of a ladder diagram or the like on a screen of a display unit of the numerical control apparatus. In displaying, sometimes displayed are: a ladder diagram representative of the sequence program; addresses of signals; symbols representative of names or identifiers given to these signals; and comments for ease of maintenance service, etc. Also adopted is a method in which a required message giving instructions to an operator is displayed on the display screen during the execution of the sequence program. In this method, it is known to enable the operator to select a language in which the message is displayed, so that the message may be displayed in the selected language. For example, in the known art, the message is displayed in Japanese when the operator selects the Japanese language, and displayed in English when the English language is selected (see JP 5-80815A).

The symbols mentioned above are names or identifiers that are given to signals appearing in the sequence program and that indicate the properties or meanings of these signals, thus aiding the understanding of the sequence program. Generally, the symbols are displayed in English.

The comments referred to by the operator when he/she performs the maintenance of the sequence program are constituted by pieces of character information serving as additional information for easier understanding and/or maintenance operation of signals appearing in the sequence program or of part or the entire of the sequence program.

The symbols and the comments are stored as part of the sequence program in the programmable controller. That is to say, the sequence program is constituted by objects in the body of program, the symbols and the comments for signals, and other data.

In the thus constructed sequence program, pieces of information given by the symbols and the comments are ancillary ones for ease of understanding and maintenance of the sequence program, and do not affect directly on sequence program operations. In manufacturing a machine having a programmable controller, therefore, some manufacturers sometimes intentionally omit symbols and/or comments in order to reduce the volume of the sequence program or to intentionally make it difficult to analyze the sequence program. Meanwhile, messages are different in purpose or purport from comments in that they are intended, as mentioned above, to give some instructions to the operator and not directly relate to signals or the like.

Conventionally, the symbol or the comment can only define single character information for a corresponding signal or the like. Even if pieces of character information are defined for each signal, their intended use is fixed and the way of use is limited. As for the symbol, which is a name or an identifier of a signal, even when it is displayed in single character information (language), no substantial problem is caused. On the other hand, if the comment serving as information for explaining the content of a signal or of the sequence program is displayed in single character information (in English, for example), the advantage thereof is reduced especially in multinational use. In order to adapt the comment to a plurality of languages, there occurs a problem that a plurality of sequence programs must be prepared that are written in various languages (Japanese, English, French, German, etc.).

SUMMARY OF THE INVENTION

The present invention provides a numerical control apparatus incorporating a programmable controller and capable of displaying a comment in a plurality of languages with a single sequence program and of displaying a proper comment in a maintenance drawing.

A numerical control apparatus of the present invention, in which a programmable controller for executing a sequence program is incorporated, comprises: comment storage means provided in the programmable controller and storing comments on signals or the sequence program with displaying attributes thereof; selecting means for selecting one of the displaying attributes; and display control means for displaying the comment according to the selected one of the displaying attributes on a display device.

The storage means may store comments for the displaying attributes of different languages. In this case, the display control means displays the comment in one of the different languages selected by the selecting means on the display device.

The storage means may store comments for the displaying attributes of different types of screens on the display device. In this case the display control means displays the comment according to one of the different types of screens selected by the selecting means on the display device.

Further, the storage means may store comments for the displaying attributes of different languages and different types of screens on the display device. In this case, the display control means displays the comment in one of the different languages selected by the selecting means and the comment according to one of the different types of screens selected by the selecting means.

According to the present invention, with use of a single sequence program, the comments can be displayed in a desired language, whereby the maintenance and management can easily be performed. The comments can also be displayed in a display form suited to a screen in which the comments are displayed, making it easy to understand the comments and perform the maintenance and management.

DETAILED DESCRIPTION

With reference to appended drawings, embodiments of the present invention will be explained.

Figure 1A:
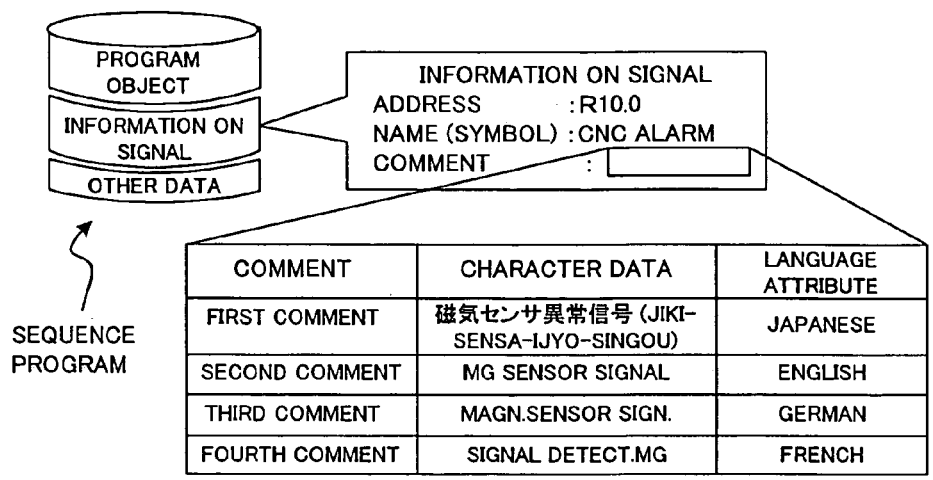
FIGS. 1a–1c are views for explaining the outline of a first embodiment of the present invention.
Figure 1B:
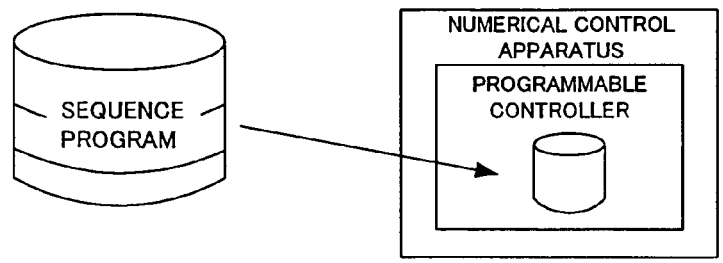
Figure 1C:
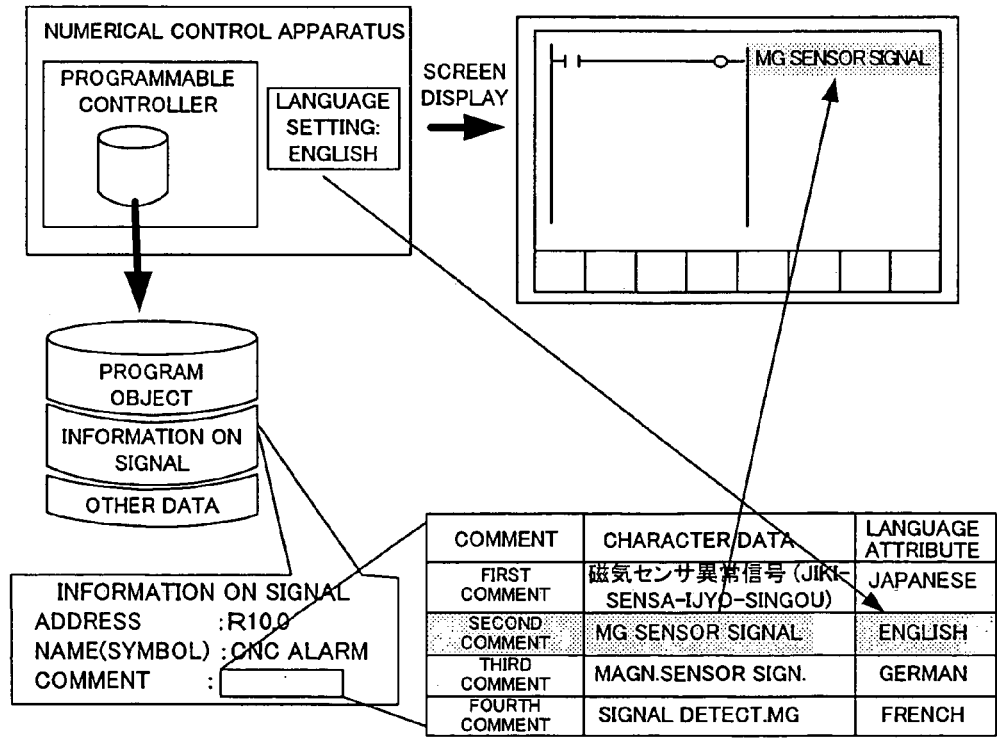

FIGS. 1a–1c are views for explaining the outline of a first embodiment of the present invention. In the first embodiment, a language used to display comments can be selected, so that the comments may be displayed in the selected language. As shown in FIG. 1a, a sequence program is constituted by objects in a program body, pieces of information on signals, and pieces of other information. Among these pieces of information, the pieces of information on signals are constituted by: addresses indicating locations of various signals such as, input/output signals that are interchanged between the programmable controller and a machine controlled by the programmable controller using the sequence program, input/output signals interchanged between the programmable controller and the numerical control apparatus, internal relays, etc.; names (symbols) given to the signals; and comments aiding the understanding of the signals and/or the sequence program. In particular in this embodiment, each of the comments on signals, etc. is stored in the form of pieces of character data explaining the meaning or content of the corresponding signal or the like in a plurality of languages. Language (display) attributes of character data are also stored so as to correspond to respective character data. In an example shown in FIG. 1a, address "R10.0" and name (symbol) "CNC ALARM" of a signal are stored. In addition, a corresponding comment is registered that includes first to fourth comments "JIKI-SENSA-IJYO-SINGOU," "MG SENSOR SIGNAL," "MAGN. SENSOR SIGN.," and "SIGNAL DETECT. MG" respectively corresponding to Japanese, English, German and French language attributes. These language attributes are also stored. The first to fourth comments indicate that the signal "CNC ALARM" represents an abnormality in a magnetic sensor.

As shown in FIG. 1b, the sequence program storing the aforementioned data of information on signals is stored in a storage section of the programmable controller in the numerical control apparatus. In accordance with the sequence program, the machine or the like adapted to be controlled by the numerical control apparatus is sequence-controlled.

When the numerical control apparatus displays the sequence program in the form of a ladder diagram, a comment display language is selectively set, and a ladder diagram display command is input. As shown in FIG. 1c, a ladder diagram is drawn in accordance with a program object, and a symbol (name) and a comment are displayed as additional information on a signal or the like appearing in the ladder diagram. At this time, the comment corresponding to the language having been set is read out from a signal information area, and displayed. In the example shown in FIG. 1c, the English language has selectively been set in the language setting. When the ladder diagram is drawn, the second comment stored as information on the signal and having English language attribute is selected, and the comment written in English is displayed in the screen.

Figure 2A:
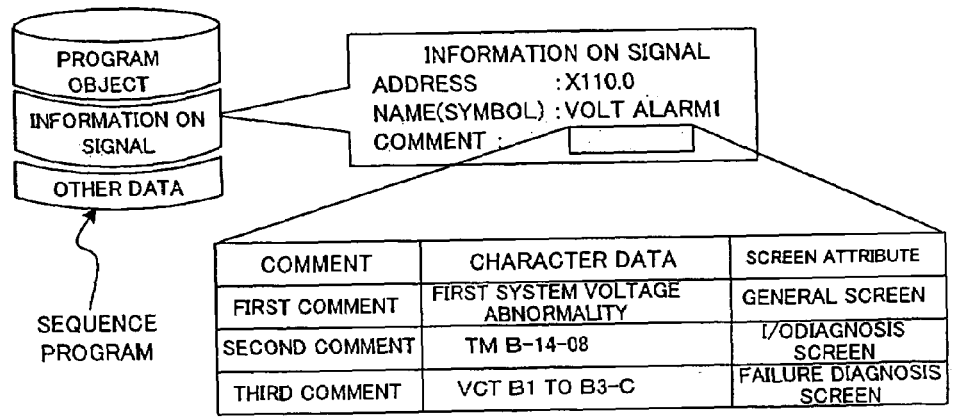
FIGS. 2a–2c are views for explaining the outline of a second embodiment of the present invention.
Figure 2B:
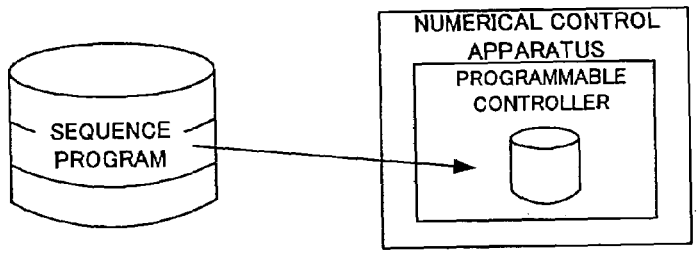
Figure 2C:
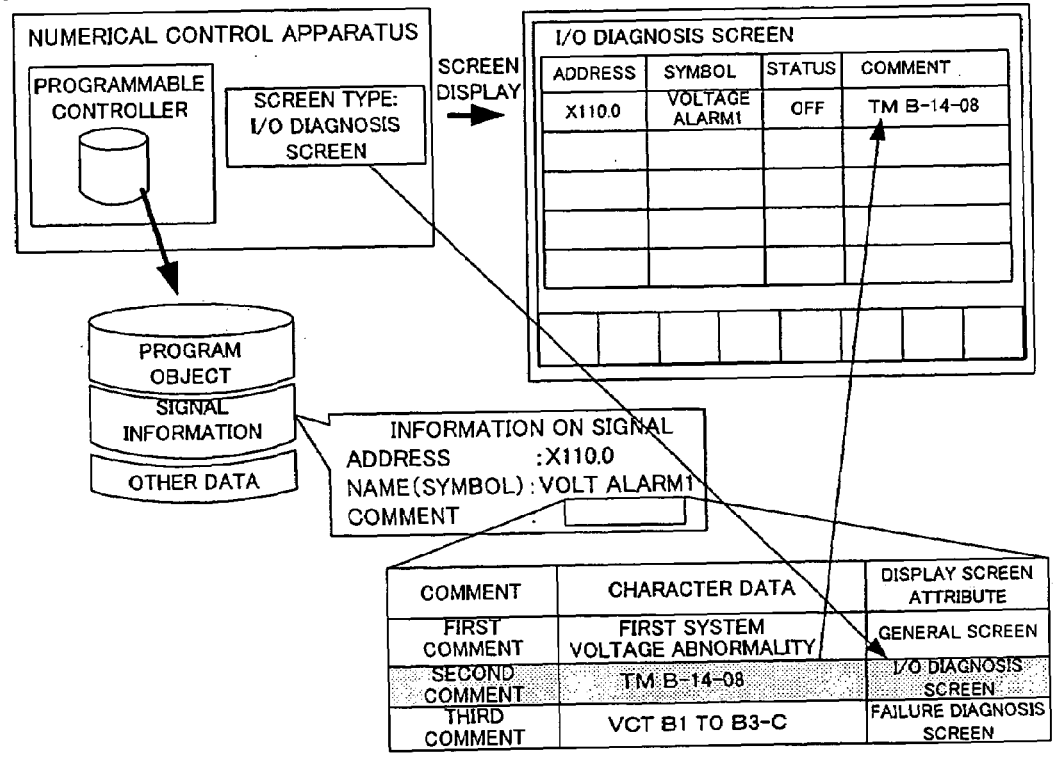

FIGS. 2a–2c are views for explaining the outline of a second embodiment of the present invention. In the second embodiment, the comment is displayed in a display form suited to a display screen in dependence on type of the display screen. As shown in FIG. 2a, in the second embodiment, display character data serving as comment of information on signal is registered for every display screen. In the example shown in FIG. 2a, the first comment "first system voltage abnormality" for general display screen is stored. The second comment "TM B-14-08" for I/O diagnosis screen, and the third comment "VCT B1 to B3-C" for failure diagnosis screen are also stored. Further, as screen (display) attributes, types of screen in which the character data of comment is to be displayed are set and stored.

The aforementioned sequence program is stored in the programmable controller incorporated in the numerical control apparatus (refer to FIG. 2b). In accordance with the sequence program, the programmable controller executes a sequence control of the machine or the like that is adapted to be controlled by the numerical control apparatus. When, for example, an "I/O diagnosis screen" is selected as a type of screen to be displayed from the numerical control apparatus, information on a signal is read out whose address written in the sequence program is X, Y, or the like indicating that this signal is an input/output signal. Then, the address, symbol (name), and status of this signal are displayed in the I/O diagnosis screen. Further, a comment is displayed. Among comments stored as pieces of "information on signal" in the sequence program for respective signals, character data having the displaying attribute of "I/O diagnosis screen" is displayed as the comment. If there is no character data of comment having the displaying attribute of "I/O diagnosis screen," no comment is displayed.

In the example shown in FIG. 2c, the I/O diagnosis screen is selected, and the address "X110.0," the symbol "VOLT ALARM1," and the status "OFF" of the I/O signal are displayed. As the comment on this signal, the second comment "TM B-14-08" specified for the I/O diagnosis screen is selected and displayed.

As explained above, in the second embodiment, the display form in which the comment for one signal is displayed is determined in accordance with the type of display screen, whereby the comment can be displayed in the display form suited to the selected display screen.

Figure 3A:
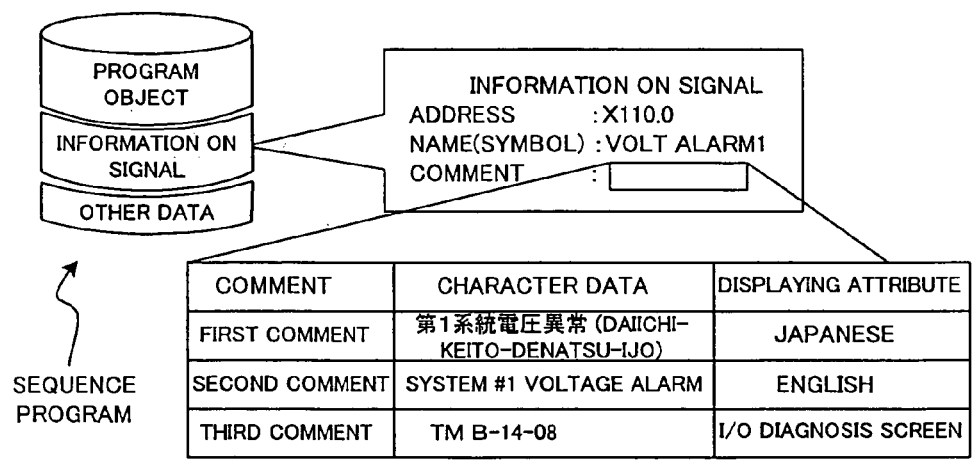
FIGS. 3a–3c are views for explaining the outline of a third embodiment of the present invention.
Figure 3B:
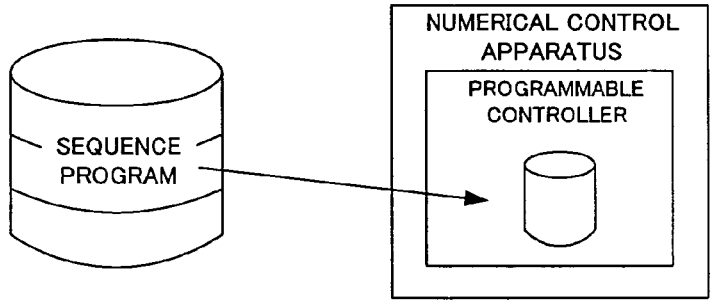
Figure 3C:
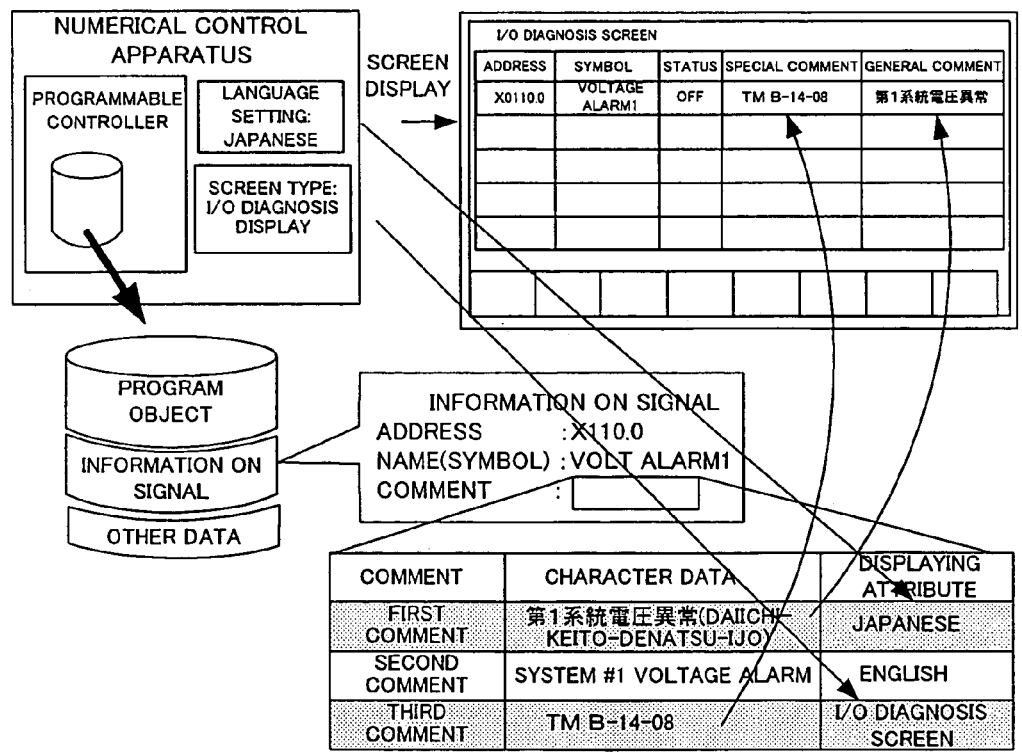

FIGS. 3a–3c are views for explaining the outline of a third embodiment of the present invention. The third embodiment is a one that combines the displaying methods of the first and second embodiments. In the third embodiment, as shown in FIG. 3a, the sequence program has a signal information area stored with the address, name (symbol), and comment for every signal. The comment is constituted by, for example, first to third comments each comprised of character data and a displaying attribute. As the displaying attribute, a display language or a type of display screen is specified. The character data is a one written in the specified display language, or a one to be displayed in the specified display screen.

In the example shown in FIG. 3a, stored are an address X110.0, a name (symbol) "VOLT ALARM1," and a comment for an output signal to be supplied to the machine. The comment includes: a first comment consisting of character data "DAIICH-KEITO-DENATSU-IJYO" and having the displaying attribute of "Japanese language"; a second comment consisting of character data "SYSTEM #1 VOLTAGE ALARM" and having the displaying attribute of English language; and a third comment consisting of character data "TM B-14-08" and having the displaying attribute of "I/O diagnosis screen." As for the comment for which the displaying attribute of screen is not specified, such comment is displayed in every screen in accordance with another displaying attribute specified therefor.

As shown in FIG. 3b, the thus prepared sequence program is stored in the programmable controller in the numerical control apparatus. In accordance with the sequence program, the numerical control apparatus and the programmable controller are driven. When a particular screen is to be read out, the screen and the language in which the displaying is to be performed are set, so that the address, name (symbol), and status of a corresponding signal are displayed, and a character string of comment specified in terms of the displaying attribute is displayed. In the example shown in FIG. 3c, the "Japanese language" is set in the language setting, and the I/O diagnosis screen is selected as display screen. For an output signal to be output as I/O signal to the machine, the address "X110.0," the name "VOLT ALARM1," and the signal status "OFF" are displayed in the I/O diagnosis screen. Further displayed therein is a character string "TM B-14-08" of the third comment that is specified to be displayed in the I/O diagnosis screen. Among the comments for which the displaying attribute of display screen is not specified, a character string "DAIICH-KEITO-DENATSU-IJYO" serving as the character data of the first comment having the displaying attribute of Japanese language is displayed in a column of general comment. To be noted, in the example of FIG. 3c, if the English language has been set in the language setting, then the second comment "SYSTEM #1 VOLTAGE ALARM" having the displaying attribute of English language is displayed in the column of general comment.

Figure 4:
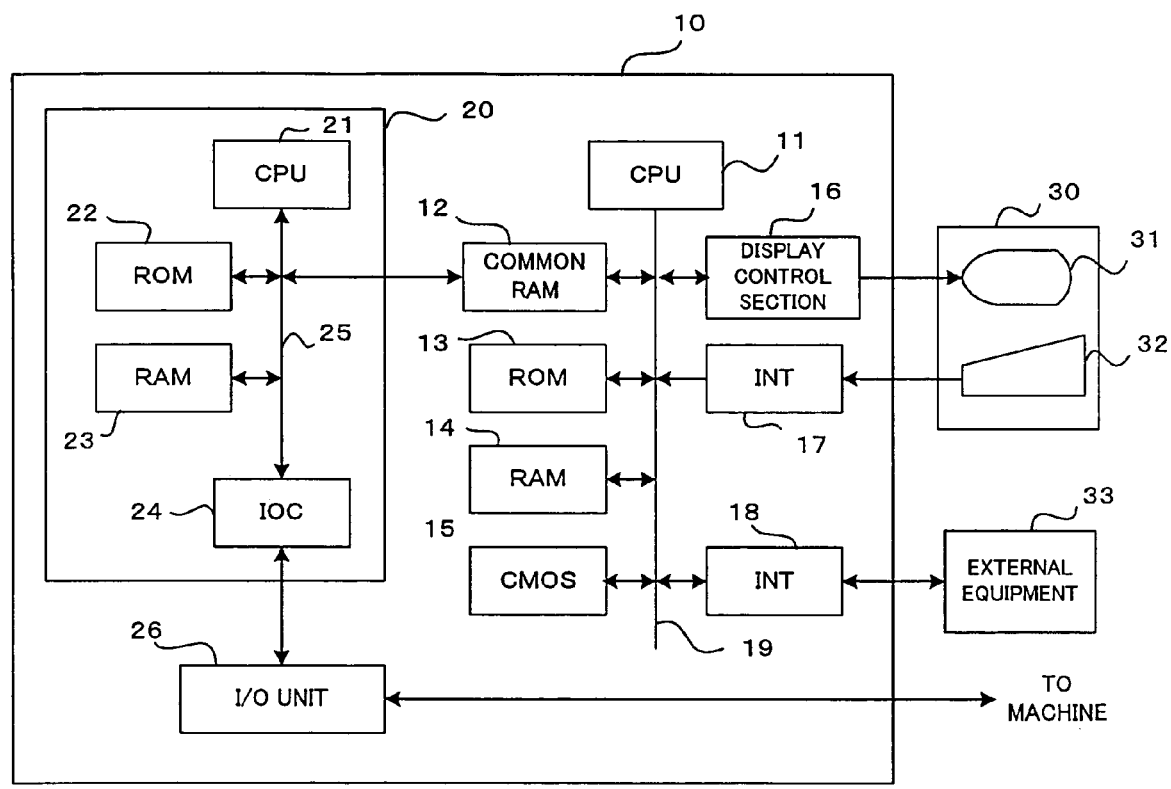
FIG. 4 is a block diagram of a numerical control apparatus used in each embodiment of the present invention.

FIG. 4 is a block diagram showing an embodiment of the numerical control apparatus incorporating the programmable controller and used to embody each of the aforementioned embodiments of the present invention. The programmable controller 20 is incorporated in the numerical control apparatus (CNC) 10. A processor 11 is connected through a bus 19 to a common RAM 12, a ROM 13, a RAM 14, a CMOS 15, a display control section 16, and interfaces 17, 18. The processor 11 reads out through the bus 19 a system program stored in the ROM 13, and in accordance with the system program, executes the overall control of the numerical control apparatus 10.

The common RAM 12 is a RAM for data exchange between the numerical control apparatus 10 and the programmable controller 20. The apparatus and the controller exchange data therebetween through the common RAM 12 which is stored with data to be accessed from both of them.

Temporary calculation data, display data, etc. are stored in the RAM 14. The CMOS 15 is constituted as a non-volatile memory stored with a machining program, parameters, etc. The CMOS 15 is backed up by a battery (not shown) so that data is retained, even if the power supply to the numerical control apparatus 10 is shut off. Parameters, etc. required for the programmable controller 20 are also stored in the CMOS 15.

The display control section 16 converts digital data into image signals and outputs the same. The digital data includes present positions of respective axes of the machine, alarms, parameters, image data, etc. In particular, in connection with the present invention, converted into the image signals are: data relating to a ladder diagram and delivered from the programmable controller 20 through the common RAM 12; address; name (symbol); and comment information. The image signals are delivered to a display device 31 of a display/data input unit 30, and are displayed on the display device 31. The display control section 16 cooperates with the display, the programmable controller 20, etc. to constitute display control means of the present invention for displaying the ladder diagram, etc.

The interface 17 receives data from a keyboard 32 of the display/data input unit 30, and delivers the data to the processor 11. Data for the programmable controller 20 can also be input from the keyboard 32, and such data is delivered to the programmable controller 20 through the common RAM 12. The keyboard 32 cooperates with function keys, etc., which are provided in the display device 31 together with the display screen, to form means of the present invention for selecting a displaying attribute of screen to be displayed on the display screen of the display, and for selecting a displaying attribute of language.

The interface 18 is an interface for external equipments. External equipments 33 such as various storage media, printer, etc. are connected to the interface. A machining program is read out from a storage medium of the external equipment 33. The machining program edited in the numerical control apparatus 10 can be output to the storage medium. In FIG. 4, illustrations of axis-control circuits for controlling servomotors, etc. of the machine controlled by the numerical control apparatus 10, servo amplifiers, a spindle control circuit, a spindle amplifier, etc. are omitted.

The programmable controller 20 has a processor 21 for performing sequence control processing. The processor 21 is connected through a bus 25 to the common RAM 12, a ROM 22, a RAM 23, and an I/O control circuit 24. In the ROM 22, a management program for controlling the programmable controller 20 is stored. As explained above, the ROM 22 is also stored with the sequence program. Input/output signals are stored in the RAM 23. The contents of these signals are renewed as the sequence program is being executed. The I/O control circuit 24 converts an output signal stored in the RAM 23 into a serial signal that is delivered to an I/O unit 26, and converts a serial input signal from the I/O unit 26 into a parallel signal that is delivered to the bus 25. The parallel signal is stored in the RAM 23 under the control of the processor 21.

The processor 21 receives a command signal such as an M function command, a T function command, or the like from the numerical control apparatus 10 through the common RAM 12, and temporarily stores the command signal in the RAM 23. In accordance with the sequence program stored in the ROM 22, the processor processes the command and outputs the same to the I/O unit 26 through the I/O control circuit 24. According to the output signal, hydraulic, pneumatic, or electromagnetic equipment is controlled.

The processor 21 receives an input signal, such as a machine-side limit switch signal from the I/O unit 26 or a signal from an operation switch on a machine operation panel, and temporarily stores the input signal in the RAM 23. An input signal not required to be processed in the programmable controller 20 is delivered to the processor 11 through the common RAM 12. Other signals are processed in the sequence program, and part of which is output to the CNC. The remaining signals are delivered as output signal to the machine from the I/O unit 26 through the I/O control circuit 24.

The aforementioned construction of the numerical control apparatus is the same as that of a conventional numerical control apparatus. The numerical control apparatus of the present invention is different from the conventional one in that displaying attributes of comments, etc. are specified in the sequence program that is stored in the ROM 22 of the programmable controller 20, as outlined in FIGS. 1a–1c, 2a–2c, and 3a–3c. Another difference resides in means and method for displaying data relating to the sequence program on the display according to the sequence program.

Figure 5:
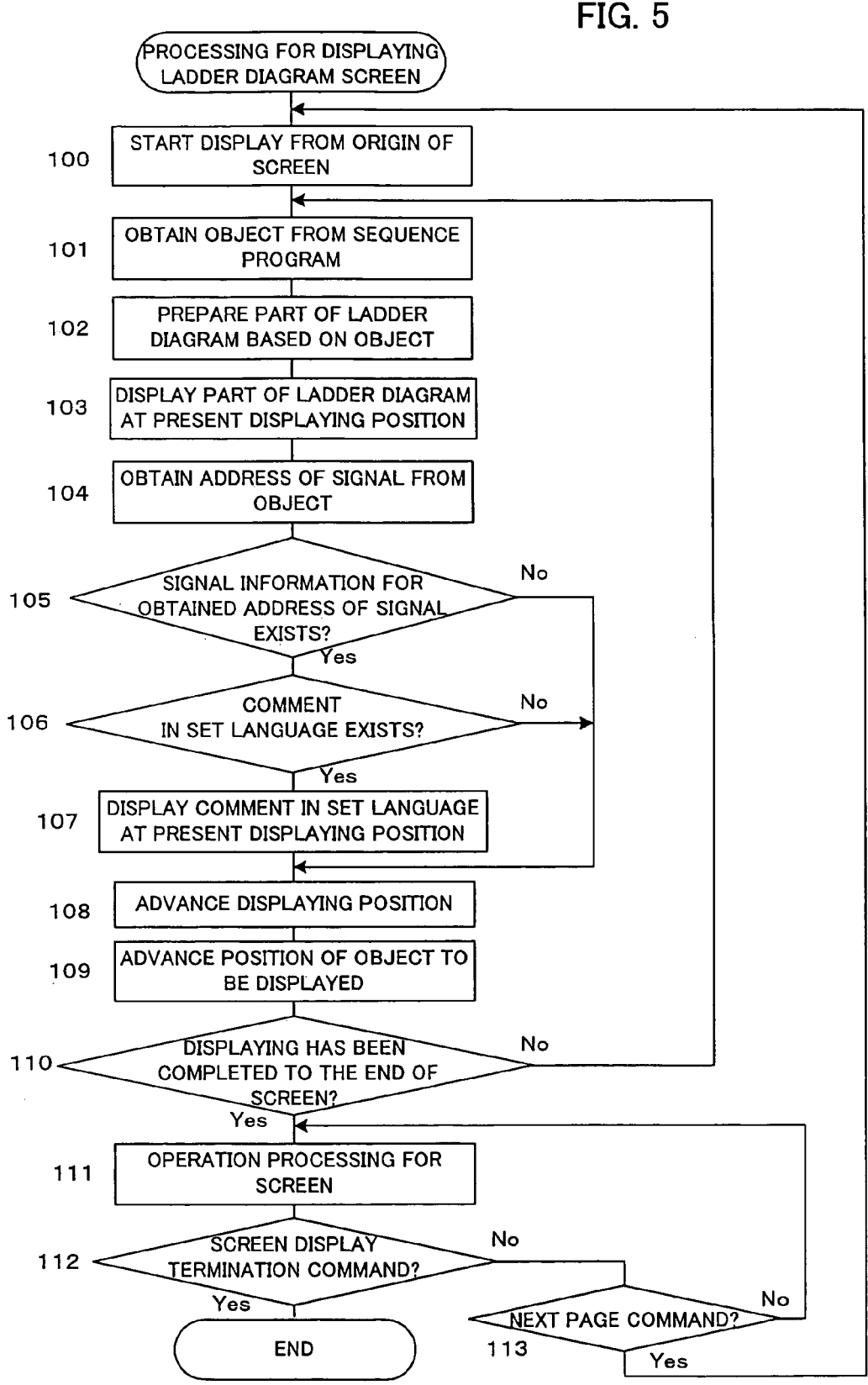
FIG. 5 is a flowchart showing processing for displaying a ladder diagram screen according to the first embodiment of the present invention.

FIG. 5 is a flowchart showing display processing mainly executed by the processor of the programmable controller 20 according to the first embodiment of the present invention whose outline has been explained above with reference to FIGS. 1a–1c.

After the setting of a language in which the comment is to be displayed is input from the keyboard 32 in the display/data input unit 30 (the language setting is unnecessary, if it has been made by a parameter in advance), when a selection signal for a ladder drawing screen in the sequence program is input, the processor 21 of the programmable controller 20 receives this selection signal through the common RAM 12, and starts the processing shown in FIG. 5.

First, an origin of the display screen in the display device 31 is set as the present position at which the displaying is to be made (Step 100). Next, an object is obtained from the top of the sequence program, and ladder diagram data are prepared and delivered to the numerical control apparatus through the common RAM 0.12. Then, a corresponding part of the ladder diagram is displayed on the present displaying position in the display screen of the display device 31 (Steps 101–103).

Next, an address of signal is obtained from the just-mentioned object (Step 104), and it is determined whether or not signal information for the address of signal exists in a storage region for signal information of the sequence program (Step 105). If there is no such signal information, the flow proceeds to Step 108. If such signal information is present, it is determined whether or not a comment in the set language exists (Step 106). If there is no such comment, the flow proceeds to Step 108. If such comment is present, the comment in the set language is displayed in the display screen (Step 107).

In the example shown in FIG. 1c, the address "R10.0" is read out from the object in the top of the sequence program. As for this address, there is stored signal information coincident therewith. Also, the comment having a language attribute of "English" coincident with the preset language which is "English" is stored as the second comment. Thus, this second comment is read out and displayed as comment in the ladder diagram screen.

The displaying position is advanced to the next position (Step 108), and the position of the object to be displayed in the sequence program is advanced (Step 109). Then, it is determined whether or not the ladder program has been displayed to the end (Step 110). If not so, the flow returns to Step 101. Whereupon, the processing in Step 101 and subsequent Steps is performed, whereby the next part of the ladder diagram is displayed in the display screen. If there is stored a comment written in the set language and corresponding to the address of signal, such comment is also displayed. Subsequently, the processing from Step 101 to Step 110 is repeatedly performed, whereby the remaining part of the ladder diagram is displayed, and comments are displayed in the preset language.

When it is detected at Step 110 that the displaying has been performed up to the end of the screen, operation processing for screen is started. During the processing, it is determined whether or not a screen display end command is input, and it is determined whether or not a command of a next page key is input (Steps 111–113). When a next page key is operated, the flow returns to Step 100, and the processing in Step 100 and the subsequent Steps is carried out to display part of the ladder diagram and a comment based on the next object in the sequence program. When a screen display termination key is operated (Step 112), the processing is terminated.

Figure 6:
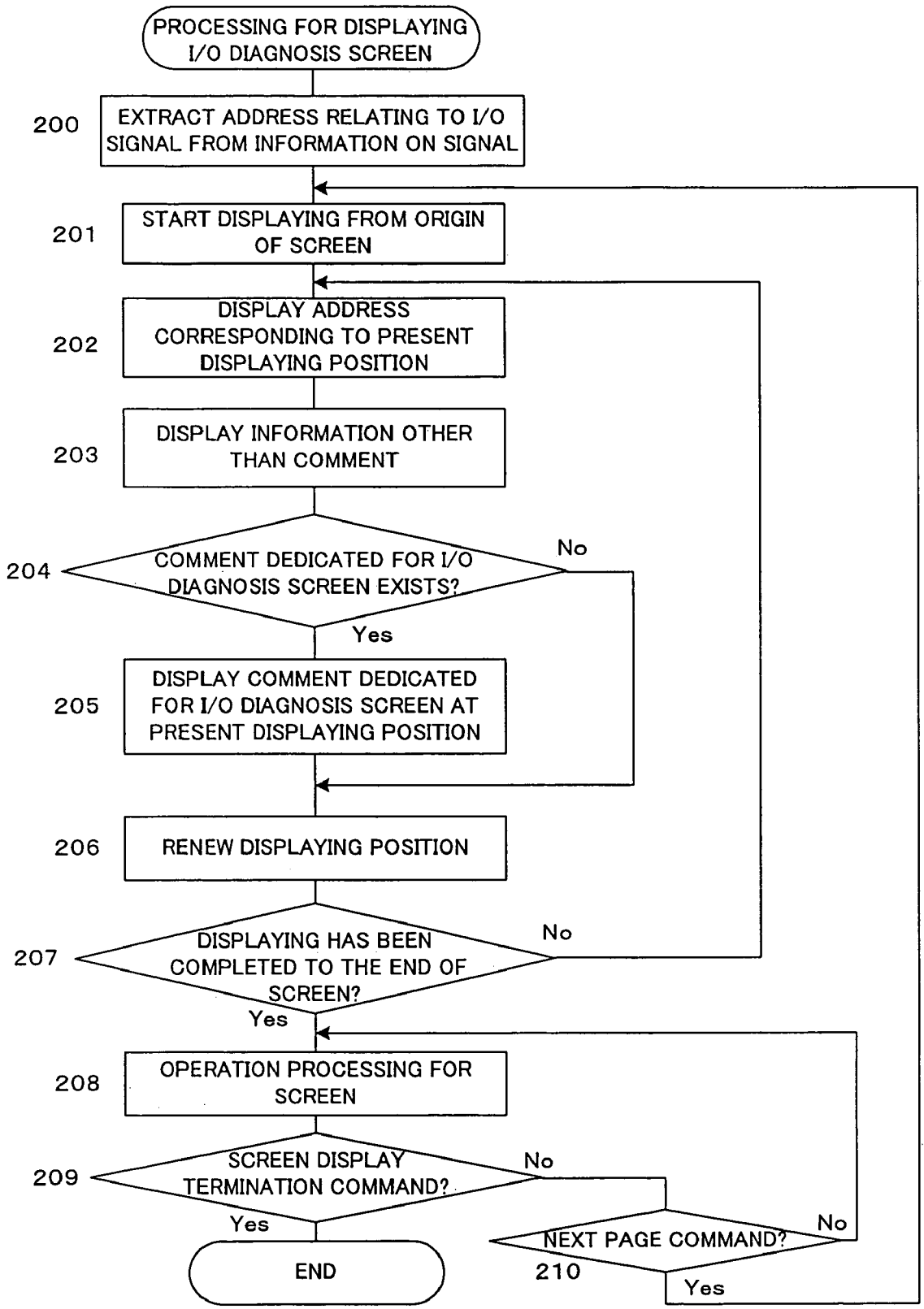
FIG. 6 is a flowchart showing processing for displaying an I/O diagnostic screen according to the second embodiment of the present invention.

FIG. 6 is a flowchart showing display processing mainly executed by the processor of the programmable controller 20 according to the second embodiment whose outline has been explained with reference to FIGS. 2a–2c.

In the second embodiment, as shown in FIG. 2, the sequence program includes signal information stored at each address with a plurality of comments for each of which a screen attribute is specified. When an operator selects a type of screen to be displayed, one or more comments are displayed, if one or more comments whose screen (display) attribute corresponds to the selected screen type are stored in some address of the signal information area in the sequence program.

In FIG. 6, there is shown processing that is executed when an I/O diagnosis screen is selected. If the I/O diagnosis screen is selected, the processor 21 of the programmable controller 20 extracts addresses relating to I/O signals (whose addresses are X, Y, etc.) from the signal information area in the sequence program (Step 200). The processor sets an origin of screen as the present position where the displaying is to be started (Step 201), displays the address corresponding to the present displaying position, and also displays information other than comment (Steps 202 and 203). Then, the processor determines whether or not there is a comment corresponding to the just-mentioned address and dedicated for the selected screen type is specified (Step 204). If there is no such comment, the flow proceeds to Step 206. If there is such a comment, that is displayed in the screen (Step 205). Whereupon, the present displaying position is renewed (Step 206).

The following is an explanation referring to the example shown in FIG. 2. Since the selected screen is the I/O diagnosis screen, addresses associated with I/O signals (whose addresses are X, Y, etc.) are extracted (Step 200). Next, the address of a first one of these I/O signals is displayed, and the symbol (name) and status of this I/O signal are displayed as other information. Then, a determination is made as to whether or not, in the column of comment, there is a comment for which the I/O diagnosis screen is specified as screen attribute. Here, the second comment for use in the I/O diagnosis screen is specified as shown in FIG. 2c, and therefore, this second comment is displayed in the display screen (Steps 201–205).

Whether or not the displaying has been performed up to the end of the screen is determined (Step 207). If the displaying up to the end has not been made, the flow returns to Step 202, and the aforementioned processing is repeatedly executed, whereby pieces of information in the addresses extracted at Step 200 are displayed in sequence.

As in the processing at Steps 110–113 of FIG. 5 in the first embodiment, when the displaying has been made up to the end of the screen, whether or not the end key is operated is determined, and whether or not the next page key is operated is determined (Steps 208–210). When the next page key is operated, the flow returns to Step 201 to perform the processing at Step 201 and the subsequent Steps. When the display end key is operated, the screen display processing is finished.

In the above-mentioned example of how to embody the second embodiment, there has been explained the case where the I/O diagnosis screen is selected. Similarly, in the case of another screen being selected, addresses corresponding to the selected screen are extracted from the sequence program, and pieces of information associated therewith are displayed. In addition, among comments regarding signals of these addresses, if there are any one or more comments for which a screen attribute corresponding to the selected screen is specified, this one or more comments are displayed. (For example, in case that a failure diagnosis screen is selected, only those comments are displayed for which the selected screen is specified as their screen attribute. In case that the general screen (used to display the ladder diagram, etc.) is selected, only comments for which the general screen is specified as their screen attribute are displayed.)

Figure 7:
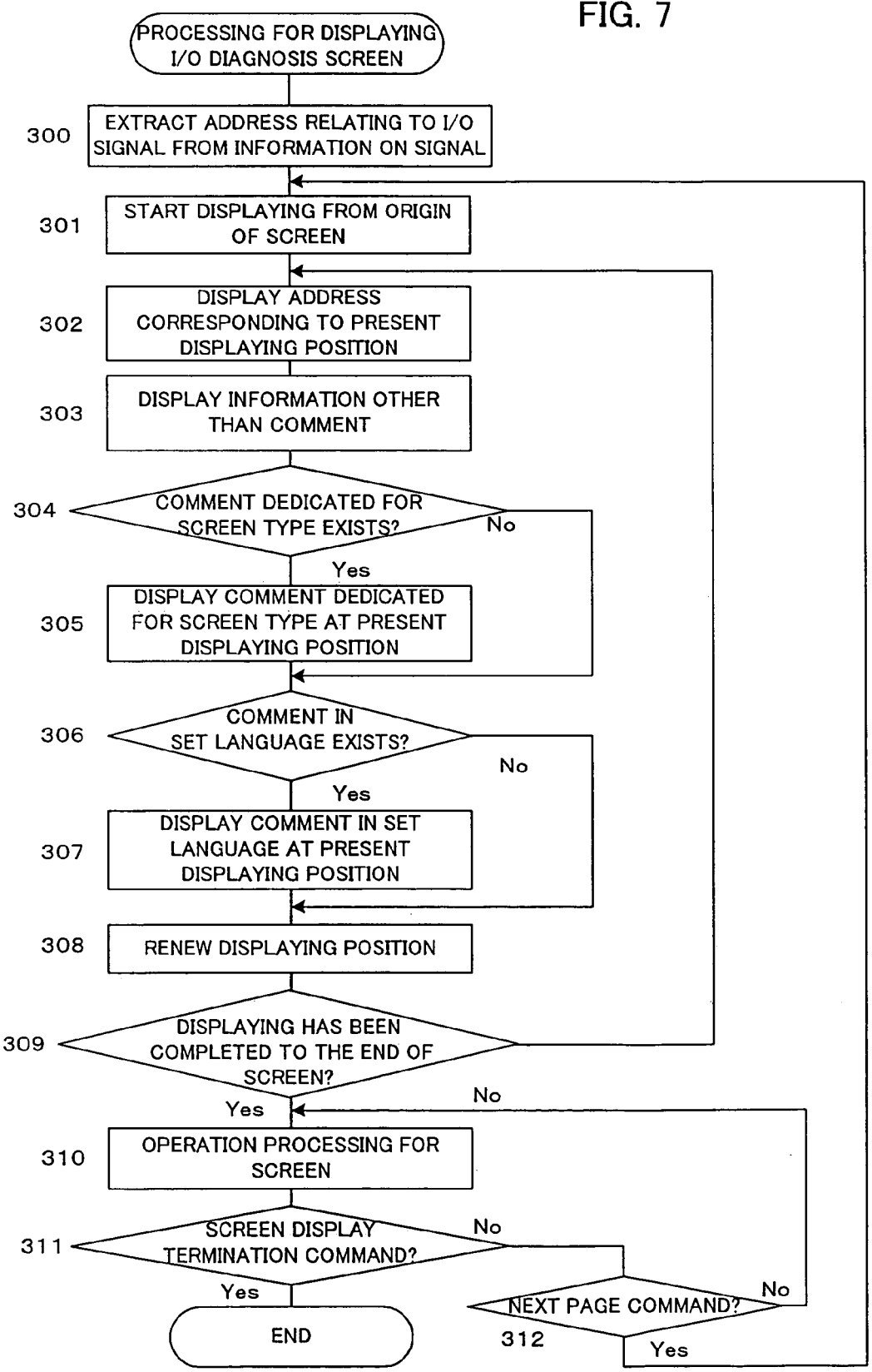
FIG. 7 is a flowchart showing processing for displaying an I/O diagnostic screen according to the third embodiment of the present invention.

FIG. 7 is a flowchart showing display processing mainly executed by the processor of the programmable controller 20 according to the third embodiment whose outline has been explained with reference to FIGS. 3a–3c.

In the third embodiment, there are comments to be displayed according to the selected screen, and there are comments to be displayed according to the language setting, irrespective of the screen setting. In the example shown in FIG. 7, a language in which comments are displayed is set, and the I/O diagnosis screen is selected as the selected screen.

As in the processing at Steps 110–113 of FIG. 5 in the first embodiment, when the displaying has been made up to the end of the screen Step 309, whether or not the end key is operated is determined, and whether or not the next page key is operated is determined (Steps 310–312). When the next page key is operated, the flow returns to Step 301 to perform the processing at Step 302 and the subsequent Steps. When the display end key is operated, the screen display processing is finished.

As in the processing shown in FIG. 6 according to the second embodiment, the processor 21 of the programmable controller 20 extracts addresses relating to I/O signals (whose addresses are X, Y, etc.) from the signal information area in the sequence program (Step 300). The screen origin is set as the present position where the displaying is to be performed (Step 301), the address corresponding to the present displaying position is displayed, and information other than comment is also displayed (Steps 302 and 303). A determination is made as to whether or not there is a comment corresponding to the just-mentioned address and dedicated for the selected screen type (I/O diagnosis screen) is specified (Step 304). If there is no such comment, the flow proceeds to Step 306. If there is such a comment, that is displayed in the screen (Step 305). In Step 306, it is determined whether or not a comment in the set language exists. If there is no such comment, the flow proceeds to Step 308, and if there is such a comment, that is displayed in the screen (Step 307). Whereupon, the flow proceeds to Step 308 to renew the present displaying position.

The following is an explanation referring to the example shown in FIGS. 3a–3c. As an address relating to the I/O diagnosis screen, an address "X110.0" of an input signal from the machine is extracted and displayed. A symbol (name) and status of this signal are also displayed. Further, comments on signal information at this address are displayed. These comments include: the third comment for which the I/O diagnosis screen is specified as screen attribute and which is to be displayed as a comment solely for the I/O diagnosis screen; and one or more comments whose displaying attributes do not relate to any screen but relate to a language corresponding to the preset language and which are to be displayed as general comment. In the example shown in FIGS. 3a–3c, the Japanese language is specified as the preset language, and the first comment whose displaying attribute is the Japanese language is displayed as general comment.

Then, as in the first and second embodiments, whether or not the displaying has been performed up to the end of the screen is determined (Step 309). If the displaying up to the end has not been made, the flow returns to Step 302 to execute the processing at Step 302 and the subsequent Steps. When the displaying has been made up to the end of the screen, whether or not the display end key or the next page key is operated is determined. When the display end key is operated, the screen display processing is finished. When the next page key is operated, the flow returns to Step 301 to perform the processing at Step 301 and the subsequent Steps, whereby the addresses, names, statuses of I/O signals as well as special comments and general comments are displayed in sequence.

In the above example, there has been explained the case where the I/O diagnosis screen is selected. Also in the case of another screen (for example, a failure diagnosis screen) being selected, processing similar to that shown in FIG. 7 is carried out. In this case, addresses of signals (indicative of a failure) corresponding to the selected another screen are selectively extracted. If there are stored any comments which are contained in the information associated with these address of signals and for which the selected screen is set as displaying attribute, such comments are displayed as special comments. In addition, comments for which no screen is specified but the preset language is specified as displaying attribute are displayed as general comment.

What is claimed is:

1. A numerical control apparatus with a programmable controller incorporated therein for executing a sequence program, comprising:
    comment storage means provided in said programmable controller and storing comments on signals or the sequence program with displaying attributes thereof;
    selecting means for selecting one of the displaying attributes; and
    display control means for displaying the comment according to the selected one of the displaying attributes on a display device.

2. A numerical control apparatus according to claim 1, wherein said storage means stores comments for the displaying attributes of different languages, and said display control means displays the comment in one of the different languages selected by said selecting means on the display device.

3. A numerical control apparatus according to claim 1, wherein said storage means stores comments for the displaying attributes of different types of screens on the display device, and said display control means displays the comment according to one of the different types of screens selected by said selecting means on the display device.

4. A numerical control apparatus according to claim 1, Wherein said storage means stores comments for the displaying attributes of different languages and different types of screens on the display device, said display control means displays the comment in one of the different languages selected by said selecting means and the comment according to one of the different types of screens selected by said selecting means.

5. A method of displaying a comment, comprising:
    storing comments in various languages; and
    displaying comments of a sequence program in a language responsive to a selected language display attribute.

6. A numerical control apparatus capable of executing a sequence program, comprising:
    a memory storing comments in various languages; and
    a display displaying comments of a sequence program in a language responsive to a selected language display attribute.

* * * * *

UNITED STATES PATENT AND TRADEMARK OFFICE
CERTIFICATE OF CORRECTION

| | | |
|---|---|---|
| PATENT NO. | : 7,152,030 B2 | Page 1 of 1 |
| APPLICATION NO. | : 11/043141 | |
| DATED | : December 19, 2006 | |
| INVENTOR(S) | : Noritake Nagashima et al. | |

It is certified that error appears in the above-identified patent and that said Letters Patent is hereby corrected as shown below:

Column 7, Line 19, change "0.12." to --12.--.

Column 10, Line 47, change "Wherein" to --wherein--.

Signed and Sealed this

First Day of May, 2007

JON W. DUDAS
*Director of the United States Patent and Trademark Office*